(12) United States Patent
Yoshikawa et al.

(10) Patent No.: US 10,493,717 B2
(45) Date of Patent: Dec. 3, 2019

(54) FIBER REINFORCED LAMINATE, SHUTTER DEVICE AND OPTICAL APPARATUS

(71) Applicant: CANON DENSHI KABUSHIKI KAISHA, Chichibu-shi (JP)

(72) Inventors: Munetoshi Yoshikawa, Chichibu (JP); Mizuho Igawa, Chichibu (JP); Fumio Shimada, Chichibu (JP); Minoru Kobayashi, Chichibu (JP); Keita Hanawa, Matsumoto (JP); Junichi Onosaka, Chiba (JP); Naoaki Maruyama, Honjo (JP)

(73) Assignee: CANON DENSHI KABUSHIKI KAISHA, Chichibu-Shi (JP)

( * ) Notice: Subject to any disclaimer, the term of this patent is extended or adjusted under 35 U.S.C. 154(b) by 0 days.

(21) Appl. No.: 16/184,265

(22) Filed: Nov. 8, 2018

(65) Prior Publication Data
US 2019/0070827 A1    Mar. 7, 2019

Related U.S. Application Data

(63) Continuation of application No. PCT/JP2017/018084, filed on May 12, 2017.

(30) Foreign Application Priority Data

May 16, 2016 (JP) .................... 2016-098127
Jun. 22, 2016 (JP) .................... 2016-123881

(51) Int. Cl.
*B32B 5/02* (2006.01)
*B32B 27/12* (2006.01)
(Continued)

(52) U.S. Cl.
CPC .................. *B32B 5/02* (2013.01); *B32B 3/28* (2013.01); *B32B 5/00* (2013.01); *B32B 7/12* (2013.01);
(Continued)

(58) Field of Classification Search
CPC .... B23B 3/25; B23B 3/28; B23B 5/00; B23B 7/12; B32B 3/25; B32B 3/28; B32B 5/00; B32B 7/12
See application file for complete search history.

(56) References Cited

U.S. PATENT DOCUMENTS 6,001,465 A * 12/1999 Takahashi ............... B32B 27/34
428/220
6,818,287 B1    11/2004 Ogawa et al.
(Continued)

FOREIGN PATENT DOCUMENTS

JP    4-125135 A    4/1992
JP    10-186448 A    7/1998
(Continued)

OTHER PUBLICATIONS

Decision to Grant a Patent in Japanese Application No. 2017-552116 (dated Dec. 15, 2017).
(Continued)

*Primary Examiner* — Minh Q Phan
(74) *Attorney, Agent, or Firm* — Venable LLP

(57) ABSTRACT

To allow a fiber reinforced laminate to have sufficient light shielding ability and to improve adherence at the interface in the laminate and durability needed for it used for a shutter blade. A fiber reinforced laminate of the present invention includes: a substrate; a black coating; and a fiber reinforced plastic layer, characterized in that the black coating is provided between the substrate and the fiber reinforced plastic layer and contains a binder resin, black particles and a filler.

20 Claims, 7 Drawing Sheets

(51) Int. Cl.
*G03B 9/36* (2006.01)
*B32B 5/00* (2006.01)
*B32B 27/20* (2006.01)
*B32B 3/28* (2006.01)
*B32B 7/12* (2006.01)
*B32B 27/36* (2006.01)

(52) U.S. Cl.
CPC .............. *B32B 27/12* (2013.01); *B32B 27/20* (2013.01); *B32B 27/36* (2013.01); *G03B 9/36* (2013.01); *B32B 2255/10* (2013.01); *B32B 2264/108* (2013.01); *B32B 2551/00* (2013.01)

(56) References Cited

U.S. PATENT DOCUMENTS

| | | |
|---|---|---|
| 9,588,401 B2 | 3/2017 | Matsuda et al. |
| 2013/0065039 A1 | 3/2013 | Tada et al. |
| 2014/0016203 A1 | 1/2014 | Toshima |

FOREIGN PATENT DOCUMENTS

| | | |
|---|---|---|
| JP | 2000-075353 A | 3/2000 |
| JP | 3215815 B2 | 10/2001 |
| JP | 2002-229097 A | 8/2002 |
| JP | 2003-280065 A | 10/2003 |
| JP | 2005-111960 A | 4/2005 |
| JP | 2008-114463 A | 5/2008 |
| JP | 2008-221624 A | 9/2008 |
| JP | 2011-215589 A | 10/2011 |
| JP | 5411841 B2 | 2/2014 |
| JP | 2015-193214 A | 11/2015 |
| WO | 2017/199886 A1 | 11/2017 |

OTHER PUBLICATIONS

International Search Report in International Patent Application No. PCT/JP2017/018084 (dated Jul. 2017).

Prepreg—Wikipedia; Processing status: May 6, 2016 (URL: https://de.wikipedia.org/w/index.php?title=Prepreg&oldid=%20154146936) (retrieved on Mar. 20, 2019).

Gloss (optics)—Wikipedia; Processing status: Dec. 7, 2015 (URL: https://en.wikipedia.org/w/index.php?title=Gloss_%28optics%29&oldid%20=694133354) (retrieved Mar. 20, 2019).

Official Letter in German Patent Application No. 11 2017 002 505.2 (Mar. 20, 2019).

* cited by examiner

FIG. 8

| CROSS-SECTIONAL OBSERVATION | | EXAMPLE |
|---|---|---|
| | AVERAGE DIFFERENCE IN HEIGHT OF CONVEXITIES AND CONCAVITIES BETWEEN CARBON FIBER REINFORCED PLASTIC LAYER AND BLACK COATING | 1.9μm |
| | AVERAGE DIFFERENCE IN HEIGHT OF CONVEXITIES AND CONCAVITIES BETWEEN PET SHEET AND BLACK COATING | 0.3μm |
| RATE OF WELL LIGHT SHIELDING ARTICLES | | 99.7% |
| DRIVE DURABILITY TEST (TEST AT 1/8000 SECONDS) | | NO ABNORMALITY NOT LESS THAN 0.3 MILLION TIMES |
| OCCURRENCE OF SCRATCHES ON SURFACE OF IMAGE SENSOR | | ABSENT |

FIBER REINFORCED LAMINATE, SHUTTER DEVICE AND OPTICAL APPARATUS

This application is a continuation of International Patent Application No. PCT/JP2017/018084 filed on May 12, 2017, and claims priority to Japanese Patent Application No. 2016-098127 filed on May 16, 2016 and Japanese Patent Application No. 2016-123881 filed on Jun. 22, 2016, the entire contents of which are incorporated herein by reference.

TECHNICAL FIELD

The present invention relates to a fiber reinforced laminate constituted by stacking fiber reinforced layers, a shutter blade using the fiber reinforced laminate, and a shutter device and an optical apparatus using the shutter blade.

BACKGROUND ART

It is known that carbon fiber reinforced plastics (CFRP) are alternately stacked as a fiber reinforced laminate to improve its strength. Such a fiber reinforced laminate is light in weight and high in rigidity, and is preferably used for shutter blades for a focal-plane shutter or the like which is used for a single lens reflex camera as an example of an optical apparatus and moves and stops for an extremely short time to cross the optical path.

Although a fiber reinforced laminate in which fibers are stacked, such as CFRP, has excellent characteristic, that is, is light in weight and high in strength, there occasionally occurs a "mesh opening" phenomenon that carbon fibers bend in the stage of stacking CFRP prepregs. Moreover, at the place of this mesh opening, light shielding ability can deteriorate.

Patent Literature 1 discloses a light shielding blade material for an optical apparatus in order to improve light shielding ability. It has a laminate structure having: a plastic film as a base material; light shielding coating films with light shielding ability which are formed on both surfaces; reinforcement members in which carbon fibers are made even as to their directions and which are stacked on the light shielding coating films; and lubricating black coating films which are formed on the reinforced members.

According to Patent Literature 1, by intervening the light shielding coating films between the carbon fiber reinforced plastic layers in the laminate constituting the blade material, light shielding ability needed as a shutter blade is obtained.

CITATION LIST

Patent Literature

PTL1: Japanese Patent No. 3215815

SUMMARY OF INVENTION

Technical Problem

A shutter blade light in weight and high in strength contributes high durability of a shutter. A shutter speed is getting higher, and the fiber reinforced laminate used for the shutter blade is being requested to be further higher in strength as a structure body recently.

The present invention is devised in view of the aforementioned circumstances, and is to provide a fiber reinforced laminate with light shielding ability capable of further improving durability characteristics.

Solution to Problem

In order to solve the aforementioned problem, there is provided a fiber reinforced laminate comprising: a substrate; a black coating; and a fiber reinforced plastic layer, wherein the black coating is provided between the substrate and the fiber reinforced plastic layer, and contains a binder resin, black particles and a filler an interface between the black coating and the fiber reinforced plastic layer has a convex and concave structure formed by the filler, the fiber reinforced plastic layer has a matrix resin, and the matrix resin comes into the convex and concave structure.

Advantageous Effects of Invention

According to the fiber reinforced laminate of the present invention, light shielding ability can be secured, and the volume fraction of reinforcement fibers on the surface layer side of the fiber reinforced plastic layer can be enhanced. As a result, sufficient light shielding ability can be secured, and the fiber reinforced laminate with high bending strength can be realized. A shutter blade having the fiber reinforced laminate of the present invention is improved in durability characteristics, and with a camera using this shutter blade, high durability, improvement in shutter speed, and the like can be realized.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings are included in the specification and constitute a part thereof. They show embodiments of the present invention and are used for explaining the principle of the present invention along with their description.

FIG. 8 is a diagram showing evaluation results of Example.

DESCRIPTION OF EMBODIMENTS

The present invention will be described with embodiments mentioned later, which relates to a fiber reinforced laminate including: a substrate; a black coating; and a carbon fiber reinforced plastic layer, wherein the black coating is provided between the substrate and the carbon fiber reinforced plastic layer, and contains a binder resin, black particles and a filler. Such a fiber reinforced laminate has high bending strength and sufficient light shielding ability, and can be preferably used as a material for shutter blades and the like.

In particular, the filler contained in the black coating brings a structure of fine convexities and concavities at the interface between the black coating and the carbon fiber reinforced plastic layer. The convexities and concavities at this interface of the black coating increase an adhesion surface area between the black coating and the carbon fiber reinforced plastic layer to enhance adhesiveness more between both. Moreover, a matrix resin such as a thermosetting resin contained in the carbon fiber reinforced plastics flows into these convexities and concavities during heating molding. Thus, the volume fraction of the matrix resin relatively increases at the interface between the carbon fiber reinforced plastic layer and the black coating. Meanwhile, the volume fraction of carbon fibers relatively increases in the vicinity of the surface layer of the carbon fiber reinforced plastic layer separate from this interface of the black coating (vicinity of the surface layer of the fiber reinforced laminate) along with the reduction of the matrix resin.

These convexities and concavities at the interface of the black coating relatively increase the volume fraction of carbon fibers in the vicinity of the surface layer of the carbon fiber reinforced plastic layer positioned on the opposite side to the substrate more than the volume fraction of carbon fibers in the vicinity of the interface between the black coating and the carbon fiber reinforced plastic layer positioned close to the substrate. The relative increase in presence rate of carbon fibers in the vicinity of the surface layer of the carbon fiber reinforced plastic layer enables high bending resistance strength as a fiber reinforced laminate and improvement in rigidity.

Hereafter, fiber reinforced laminates of the present invention will be exemplarily described with reference to the drawings.

Notably, for the sake of understanding of the present invention, an embodiment in which a fiber reinforced laminate of the present invention is used for a shutter blade of a shutter device is described. Nevertheless, it is needless to say that a fiber reinforced laminate of the present invention can also be applied to window shades and various structural materials.

Figure 6:
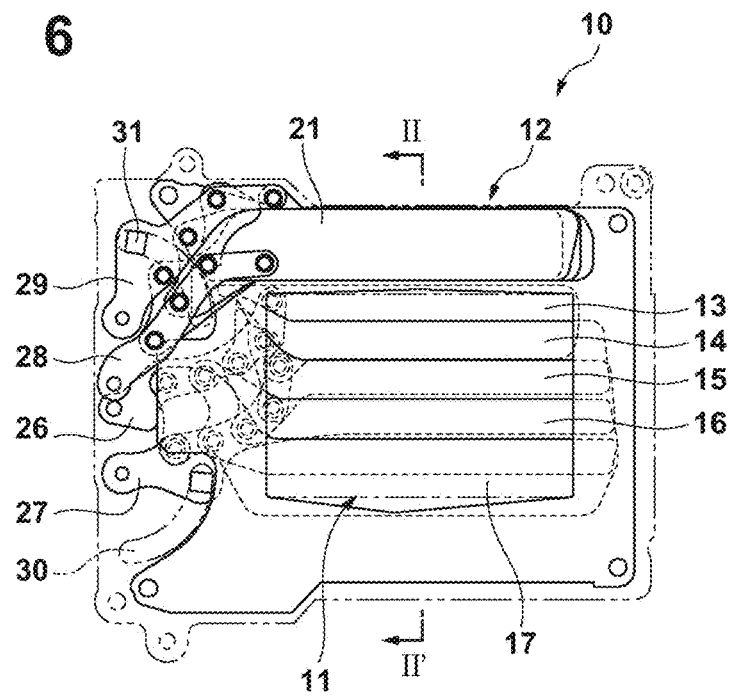
FIG. 6 is a diagram showing a shutter device according to an embodiment.
Figure 7:
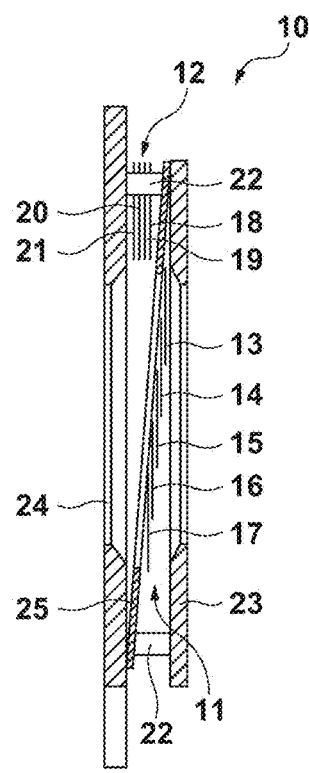
FIG. 7 is a cross-sectional view taken along the line II-II' in FIG. 6.

FIG. 6 shows an elevational shape of a shutter device according to an embodiment. A shutter device 10 shown in FIG. 6 is a focal-plane shutter unit. Moreover, FIG. 7 is a cross-sectional view taken along the line II-II' in FIG. 6. A focal-plane shutter unit 10 according to the present embodiment is called a vertical travel type. Namely, the focal plane shutter unit 10 has a front curtain 11 and a rear curtain 12 which travel in the vertical direction, and the opening part of a shutter base plate 24 is opened and closed using the front curtain 11 and the rear curtain 12. Each of the front curtain 11 and the rear curtain 12 is constituted of one or more shutter blades. Specifically, the front curtain 11 is constituted of five shutter blades 13, 14, 15, 16 and 17 overlapping with one another, and the rear curtain 12 is constituted of four shutter blades 18, 19, 20 and 21 overlapping with one another. The longitudinal direction of each of the shutter blades 13 to 21 is substantially perpendicular to the movement direction thereof.

To the frame-shaped shutter base plate 24, a frame-shaped cover plate 23 is attached to be parallel thereto via a plurality of spacers 22, and it prevents the shutter blades 13 to 17 of the front curtain 11 from spreading in the direction perpendicular to the blade travelling direction. Moreover, between the cover plate 23 and the shutter base plate 24, a frame-shaped partitioning plate 25 which partitions a travelling space for the front curtain 11 and a travelling space for the rear curtain 12 from each other is attached obliquely to the shutter base plate 24. The front curtain 11 is disposed between the cover plate 23 and the partitioning plate 25, and the rear curtain 12 is disposed between the partitioning plate 25 and the shutter base plate 24.

Longitudinal directional one ends (on the left side in FIG. 6) of the shutter blades 13 to 17 constituting the front curtain 11 are respectively attached to a front curtain support arm 26 and a front curtain drive arm 27 with caulking dowels, and the shutter blades 13 to 17 are configured to interlinkingly travel in the vertical direction. The front curtain support arm 26 and the front curtain drive arm 27 are rotatably attached to the shutter base plate 24 at their respective proximal end parts.

Likewise, longitudinal directional one ends of the shutter blades 18 to 21 constituting the rear curtain 12 are respectively attached to a rear curtain support arm 28 and a rear curtain drive arm 29 with caulking dowels, and the shutter blades 18 to 21 are configured to interlinkingly travel in the vertical direction. The rear curtain support arm 28 and the rear curtain drive arm 29 are rotatably attached to the shutter base plate 24 at their respective proximal end parts.

The front curtain drive arm 27 and the rear curtain drive arm 29 respectively slidably engage with arc-shaped guide grooves 30 and 31 formed in the cover plate 23 and the shutter base plate 24. Moreover, when the front curtain drive arm 27 and the rear curtain drive arm 29 rotate upon reception of driving force from a drive unit (not shown), the front curtain support arm 26 and the rear curtain support arm 28 also interlockingly move, so that the shutter blades 13 to 17 and 18 to 21 are superimposed on one another or developed.

Namely, in an imaging standby state, the shutter blades 13 to 17 of the front curtain 11 are in a developed state, and the shutter blades 18 to 21 of the rear curtain 12 are in a superimposed state. Then, in performing imaging, the shutter blades 13 to 17 of the front curtain 11 start to be operated to be superimposed on one another. In addition to this, after the elapse of a predetermined time from the start of this operation, the shutter blades 18 to 21 of the rear curtain 12 start to be operated to be developed. After the end of the imaging, the shutter blades 13 to 17 of the front curtain 11 and the shutter blades 18 to 21 of the rear curtain 12 are set to be in the imaging standby state.

By such travel of the shutter blades 13 to 17 of the front curtain 11 and the shutter blades 18 to 21 of the rear curtain 12, a frame-shaped light passage port which allows an imaging light beam to pass through is formed at the center of the partitioning plate 25, the shutter base plate 24 and the cover plate 23. The imaging light beam incident through a lens (not shown) passes through the aforementioned light passage port, and exposes an image sensor such as a CCD or a film.

Such a configuration of the focal plane shutter unit 10 as above is a mere example therefor, and known configurations disclosed in Japanese Patent Laid-Open No. 10-186448, Japanese Patent Laid-Open No. 2002-229097, Japanese Patent Laid-Open No. 2003-280065 and the like can be used therefor.

Moreover, the shutter device of the present embodiment can be implemented and used in an optical apparatus such, for example, as a camera. Namely, in a camera including a casing, an optical system like a lens, and an imaging unit like an image sensor, the shutter device can be disposed so as to shut a path of light incident on the image sensor through the optical system.

Next, a configuration of the shutter blades 13 to 21 is described. At least one of the shutter blades 13 to 21 can be a shutter blade composed of a fiber reinforced laminate of the present invention.

The shutter blade composed of the fiber reinforced laminate is hereinafter called a shutter blade according to the present embodiment. All the shutter blades 13 to 21 are preferably shutter blades according to the present embodiment in view of durability and light shielding ability. Meanwhile, shutter blades according to the present embodiment may be used along with other shutter blades to reduce costs. Since the shutter blade according to the present embodiment has high strength, it is preferably used as a shutter blade that more tends to receive impact. Specifically, the shutter blade according to the present embodiment can be used as a shutter blade that is large in movement amount in shutter opening and closing. The shutter blades according to the present embodiment can be used, in the example of FIG. 6, as the shutter blades 13, 14, 20 and 21 which are larger in movement amount and more tend to receive impact. The other shutter blades are not specially limited but examples thereof include shutter blades composed of aluminum alloy plate materials. In particular, when they are used for the shutter blades 14 and 20 which are second largest in movement amount, this can suppress the shutter blades 15 and 19 which are third largest in movement amount from bending. Further, in the case where the shutter blades according to the present embodiment are used for the elements 14 and 20, when flat surface blades are used for the shutter blades 13 and 21 which are largest in movement amount and disposed at the top and the bottom, and the shutter blades 15 and 19 which are third largest in movement amount, their contact areas with their upper and lower blades can be reduced, which can achieve excellent slidability. The flat surface may be formed by blackening coating, and an object of the blackening coating may be a metal blade or a resin shutter blade. In particular, in the case where the rear curtain is disposed to be close to the image sensor, when the shutter blade according to the present embodiment is used for the shutter blade 20, of the rear curtain, which is second largest in movement amount, this can effectively suppress the shutter blade 19 from travelling off out to the image sensor side.

Figure 5A:
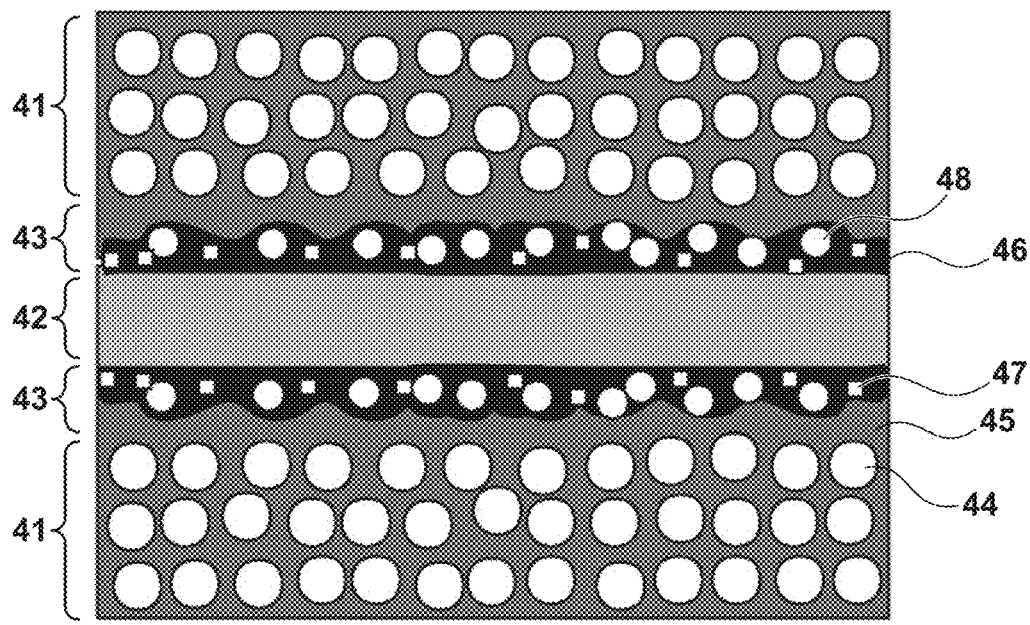
FIG. 5A is a cross-sectional view of a fiber reinforced laminate according to an embodiment.

FIG. 5A exemplarily shows a cross-sectional view of the fiber reinforced laminate according to an embodiment. The fiber reinforced laminate has carbon fiber reinforced plastic layers 41, a substrate 42 and black coatings 43. The black coating 43 is provided between the carbon fiber reinforced plastic layer 41 and the substrate 42. Moreover, the black coating 43 contains a binder resin 46, black particles 47 and a filler 48. The carbon fiber reinforced plastic layer 41 contains a matrix resin 45 which is a resin composition holding carbon fibers 44.

In the fiber reinforced laminate, two or more carbon fiber reinforced plastic layers 41 may be stacked, and/or two or more black coatings 43 may be included. In the fiber reinforced laminate of FIG. 5A, the black coatings 43 and the carbon fiber reinforced plastic layers 41 are provided on both surfaces of the substrate 42.

The interface between the black coating 43 and the carbon fiber reinforced plastic layer 41 has a convex and concave structure, the matrix resin 45 of the carbon fiber reinforced plastic layer 41 comes into the convex and concave structure, and adhesiveness between the carbon fiber reinforced plastic layer 41 and the black coating 43 is improved. Moreover, the interface between the black coating 43 and the substrate 42 has a convex and concave structure, convexities and concavities at the interface of the black coating 43 on the carbon fiber reinforced plastic layer side may be larger than convexities and concavities at the interface thereof on the substrate side. As above, by positively forming the convexities and concavities at the interface on the carbon fiber reinforced plastic layer side so as to be larger than the convexities and concavities at the interface on the substrate side, a contact area between the black coating 43 and the carbon fiber reinforced plastic layer 41 increases, and the matrix resin 45 contained in the carbon fiber reinforced plastic layer 41 preferably comes into contact with the convexities and concavities on the surface of the black coating 43 on the carbon fiber reinforced plastic layer side, which thereby improves adhesiveness.

(Black Coating)

The black coating contains a filler, a binder resin and black particles, which are sequentially described.

The filler contained in the black coating is a particulate, fibrous, plate-like or amorphous inorganic compound or organic compound, and solid particles at ambient temperature. The filler affords fine convexities and concavities at the interface of the black coating to strengthen adhesiveness between the black coating and the carbon fiber reinforced plastic layer, and affords an increase in relative volume fraction of carbon fibers in the vicinity of the surface layer of the fiber reinforced laminate to enhance bending resistance strength of the fiber reinforced laminate, which improves rigidity thereof.

As the filler, any of organics such as crosslinked acrylic resin beads, and inorganics such as silica, magnesium aluminometasilicate, and magnesium can be used, and one of these, or a mixture of two or more of these can be used. Above all, an inorganic filler, in particular, silica is preferably used in view of dispersibility and low costs. The inorganic filler can be easily handled since the shape thereof less deforms under heating.

An average particle diameter in the case of a particulate filler, or a traverse directional average diameter in the case of a fibrous filler can be smaller than a traverse directional average diameter of carbon fibers of the carbon fiber reinforced plastic layer. When the average particle diameter (traverse directional average diameter) of the filler is smaller than the traverse directional average diameter of the carbon fibers of the carbon fiber reinforced plastic layer, the carbon fibers do not intrude into concavities at the interface, which improves strength. Moreover, the average particle diameter (traverse directional average diameter) of the filler can be larger than an average particle diameter of the black particles contained in the black coating layer.

In order to form the convex and concave structure at the interface of the black coating, the average particle diameter (traverse directional average diameter) of the filler can be 0.5 μm or more in an embodiment, 1.0 μm or more in another embodiment, and 2.0 μm or more in still another embodiment. In order to improve bonding ability of the black coating, the average particle diameter (traverse directional average diameter) of the filler can be 10.0 μm or less in an embodiment, 8.0 μm or less in another embodiment, and 6.0 μm or less in still another embodiment.

Each of the average particle diameter (traverse directional average diameter) of the filler and the traverse directional average diameter of the carbon fibers is obtained by an arithmetic mean of values of particle diameters obtained using an electron microscope. The "average" means a mean value obtained by measuring a statistically reliable number of filler pieces or carbon fibers, and the number is typically 10 or more, preferably 50 or more, still preferably 100 or more.

In order to form the convex and concave structure at the interface of the black coating, the content rate of the filler in the black coating can be 0.5 mass % or more in an embodiment, 1.0 mass % or more in another embodiment, and 2.0 mass % or more in still another embodiment. In order to improve bonding ability of the black coating, the content rate of the filler can be 10.0 mass % or less in an embodiment, 8.0 mass % or less in another embodiment, and 5.0 mass % or less in still another embodiment.

The binder resin contained in the black coating is a liquid or solid resin, at ambient temperature, in which the filler and the black particles are dispersed and retained. According to an embodiment, in order to obtain a preferable surface mode, the binder resin can be a liquid resin which can form a black coating solution in which the black particles and the filler are uniformly dispersed.

Examples of the binder resin include thermoplastic resins and thermosetting resins, such as poly(meth)acrylate-based resins, polyester resins, a polyvinyl acetate resin, polyvinyl chloride, a polyvinyl butyral resin, cellulose-based resins, a polystyrene-polybutadiene resin, polyurethane resins, alkyd resins, acrylic resins, unsaturated polyester resins, epoxyester resins, epoxy resins, epoxyacrylate-based resins, urethaneacrylate-based resins, polyesteracrylate-based resins, polyetheracrylate-based resins, phenol-based resins, melamine-based resins, urea-based resins, and diarylphthalate-based resins. One of these or a mixture of two or more of these can be used.

In order to improve adhesiveness between the substrate and the black coating, the content rate of the binder resin in the black coating can be 60 mass % or more in an embodiment, 65 mass % or more in another embodiment, and 70 mass % or more in still another embodiment. In order to obtain sufficient light shielding ability, the content rate of the binder resin can be 85 mass % or less in an embodiment, 80 mass % or less in another embodiment, and 75 mass % or less in still another embodiment.

Notably, when the binder resin and the matrix resin of the carbon fiber reinforced plastic layer are the same type of resin, excellent adhesiveness can be obtained. Moreover, since an acrylic resin and an epoxy resin show relatively well adhesiveness, when the binder is the acrylic resin and the matrix resin of the carbon fiber reinforced plastic layer is the epoxy resin, adhesiveness under heating can be excellent. Otherwise, the binder resin may be the epoxy resin, and the matrix resin may be the acrylic resin.

The black particles contained in the black coating are a particulate, fibrous, plate-like or amorphous inorganic compound or organic compound, are solid particles at ambient temperature, and can color the binder resin black to preferably give it light shielding ability. In order to improve dispersibility in the black coating, the average particle diameter of the black particles can be 0.01 μm or more in an embodiment, 0.05 μm or more in another embodiment, and 0.1 μm or more in still another embodiment. In order to improve light shielding ability of the black coating, the average particle diameter of the black particles can be 2.0 μm or less in an embodiment, 1.0 μm or less in another embodiment, and 0.5 μm or less in still another embodiment.

According to an embodiment, examples of the black particles include carbon black. In order to obtain sufficient light shielding ability, the average particle diameter of the carbon black is preferably less than 1 μm, still preferably 0.5 μm or less. The average particle diameter of the black particles is measured by a dynamic light scattering-type particle size distribution measurement apparatus or the like as a 50% cumulative value of a volume-based particle diameter distribution.

Moreover, in order to improve light shielding ability of the black coating, the content rate of the black particles in the black coating can be 5 mass % or more in an embodiment, 10 mass % or more in another embodiment, and 15 mass % or more in still another embodiment. In order to improve adhesiveness and coating strength with respect to the substrate and the carbon fiber reinforced plastic layer, the content rate of the black particles can be 30 mass % or less in an embodiment, 20 mass % or less in another embodiment, and 18 mass % or less in still another embodiment.

In order to improve light shielding ability of the black coating and strength of the black coating itself, the thickness of the black coating can be 0.5 μm or more in an embodiment, 1.0 μm or more in another embodiment, and 3.0 μm or more in still another embodiment. In order to improve adherence with respect to the substrate and the carbon fiber reinforced plastic layer, the thickness of the black coating can be 15.0 μm or less in an embodiment, 10.0 μm or less in another embodiment, and 7.0 μm or less in still another embodiment.

When a plastic material having thickness of not less than 10 μm and not more than 15 μm is used for the substrate, in order to prevent the plastic material from warping, the total film thickness of the black coatings provided on the plastic material is preferably not to exceed the thickness of the plastic material. The black coatings may be provided on both surfaces of the plastic material.

Furthermore, the black coating has convex and concave structures at the interface between the black coating itself and the carbon fiber reinforced plastic layer disposed thereon and at the interface between the black coating itself and the substrate. An average difference in height of convexities and concavities at the interface between the carbon fiber reinforced plastic layer and the black coating is larger than an average difference in height of convexities and concavities at the interface between the black coating and the substrate. By causing the black coating to include the filler in order to positively form the convexities and concavities at its interface with the carbon fiber reinforced plastic layer, the area of the interface between the black coating and the carbon fiber reinforced plastic layer increases. The matrix resin contained in the stacked carbon fiber reinforced plastic layer preferably comes into contact with the convex and concave surface, of the black coating, whose area has increased, which improves adhesiveness. As a result, adhesiveness between the substrate and the carbon fiber reinforced plastic layer becomes much strong via the black coating, which can afford the fiber reinforced laminate in which the stacked layers excellently closely adhere to one another. The ratio of the average difference in height of the convexities and concavities at the interface with the carbon fiber reinforced plastic layer relative to the average difference in height of the convexities and concavities at the interface with the substrate can be 1.5 or more in an embodiment, 2 or more in another embodiment, and 5 or more in still another embodiment in order to improve adhesiveness.

The average difference in height of convexities and concavities is obtained as the sum of the average in distance of the convex sides from a reference line and the average in distance of the concave sides from the reference line for the convexities and concavities, the reference line crossing the convexities and concavities and being parallel to the substrate surface, in a cross section with 10 μm×10 μm of field of view including the interface in the thickness direction of the fiber reinforced laminate. Notably, such a cross section of the fiber reinforced laminate is observed with an electron microscope.

The black coating can be formed as follows. A black coating solution containing the aforementioned binder resin, black particles (carbon black or the like) and filler is prepared in advance. The black coating solution is applied onto the surface of the substrate (plastic material or the like) by a conventionally known coating method such as dip coating, roll coating, bar coating, die coating, blade coating and air knife coating, and after dried, is heated and/or pressurized as needed. Notably, as a solvent of the black coating solution, water, an organic solvent, a mixture of water and an organic solvent, or the like can be used.

By appropriately adjusting the content rate and the particle diameter of the filler added into the black coating solution, the state of the convexities and concavities at the interface between the black coating and the carbon fiber reinforced plastic layer is controlled. The convex and concave surface is thereby preferably formed such that the length of the distance between adjacent convexities or adjacent concavities out of the convexities and concavities is smaller than the single fiber diameter of the carbon fibers constituting the carbon fiber reinforced plastics.

By forming convexities and concavities in the interface of the black coating, the carbon fibers themselves do not flow into the concavities but the matrix resin contained in the carbon fiber reinforced plastic layer predominantly flows into the concavities of the black coating during heating molding. Therefore, the volume fraction of the matrix resin preferably relatively increases in the vicinity of the interface between the black coating and the carbon fiber reinforced plastic layer. As a result, the fiber reinforced laminate that has a high volume fraction of carbon fibers in the surface portion of the carbon fiber reinforced plastic layer can be stably formed.

Notably, in FIG. 5A, the binder resin 46 of the black coating 43 covers the filler 48, and the binder resin 46 adheres to the matrix resin 45 of the carbon fiber reinforced plastic layer 41. Nevertheless, the interface of the black coating between the black coating and the carbon fiber reinforced plastic layer may be constituted of at least one of the filler and the binder resin. By the binder resin 46 of the black coating at least constituting the interface including convexities and concavities entirely or partially, its adhesion strength to the matrix resin, included in the carbon fiber reinforced plastic layer, which is an organic substance of the same type is improved.

(Carbon Fiber Reinforced Plastic Layer)

The carbon fiber reinforced plastic layer can be a carbon fiber reinforced plastic prepreg sheet (hereinafter called CFRP prepreg sheet) formed by impregnating carbon reinforcement fibers with a thermoplastic resin or the like. In order to achieve uniform distribution in the matrix resin and improve strength, the thickness of the CFRP prepreg sheet can be 10 μm or more in an embodiment, 15 μm or more in another embodiment, and 20 μm or more in still another embodiment. In order to enhance shutter drive speed to be high with the CFRP prepreg sheet used for a shutter blade and to thin the shutter unit, its thickness can be 80 μm or less in an embodiment, 60 μm or less in another embodiment, and 40 μm or less in still another embodiment.

Moreover, when a fiber reinforced laminate is formed of layers made of materials different in bending strength, the bending strength of the outer layer is predominant in the bending strength of the fiber reinforced laminate. Hence, the outer layer desirably includes carbon fibers, which are high in strength. Therefore, when a CFRP prepreg sheet with twice or more thickness of the thickness of the substrate is used, a fiber reinforced laminate large in bending strength can be obtained.

Moreover, in the thickness direction of the carbon fiber reinforced plastic layer, the volume fraction of carbon fibers in the vicinity of the surface layer of the carbon fiber reinforced plastic layer on the opposite side of the substrate relatively more increases than the volume fraction of carbon fibers in the vicinity of the interface of the black coating close to the substrate. Continuous or intermittent change of the volume fraction of carbon fibers in the thickness direction of the carbon fiber reinforced plastic layer can be confirmed by observing a thicknesswise directional cross section of the fiber reinforced laminate with an electron microscope or the like.

(Substrate)

The substrate is a plate-like member which is composed of an organic compound, an inorganic compound or a metal and on which the black coatings and the carbon fiber reinforced plastic layers can be provided. According to an embodiment, the substrate can be composed of a plastic material. Examples of usable plastic materials include synthetic resin films such as polyester films, polyimide films, polystyrene films and polycarbonate films. According to an embodiment, a polyester film is used which is a biaxially oriented polyester film (biaxially oriented PET film or the like) obtained by orientation processing, in particular, biaxial orientation processing, in view of improvement of mechanical strength and dimensional stability. A fiber reinforced layer using carbon fibers or the like may be used. With heat tolerance and durability taken into consideration, PEN or the like whose glass transition temperature is not less than 120° C. is preferably used. A glass transition temperature not less than 200° C. which is achieved by PEEK and polyimide films or the like enables degradation or the like of the resin to be diminished even under condensed sunlight with a lens. Notably, for an example of the present invention, use of PET which is a transparent resin is described below. Nevertheless, use of a colored polyimide film or the like enables a black coating film to be thinner. Notably, a polyimide film is brown, and another transparent and uncolored resin film mixed with carbon black may be used as a black resin substrate.

Of course the plastic material can be transparent to visible light, and a foamed polyester film, or a synthetic resin film containing a carbon black pigment or another pigment can also be used for it, appropriately selected for its use.

In order to improve strength of the plastic material itself and to enhance shutter drive speed to be high in the case where the fiber reinforced laminate is used as a shutter blade, the thickness of the plastic material can be 5 μm or more in an embodiment, 10 μm or more in another embodiment, and 20 μm or more in still another embodiment. In order to thin a shutter unit in the case where the fiber reinforced laminate is used as its shutter blade, the thickness of the plastic material can be 100 μm or less in an embodiment, 60 μm or less in another embodiment, and 30 μm or less in still another embodiment.

Notably, in view of improvement of adhesiveness between the plastic material and the black coating in forming the black coating on the surface of the plastic material, UV-ozone processing or corona processing may be performed on the plastic material as needed. Notably, since the synthetic resin film containing a carbon black pigment or another pigment contains fine colored particles inside, the influence of the size of the fine colored particles on flatness of the substrate becomes relatively larger as the thickness of the substrate becomes smaller. Therefore, when a plastic material not less than 10 μm and not more than 15 μm is used, a transparent plastic material without fine colored particles is preferably used in order to obtain excellent flatness.

In order to improve strength and enhance a shutter drive speed to be high, the total thickness of the shutter blade can be 60 μm or more in an embodiment, 80 μm or more in another embodiment, and 90 μm or more in still another embodiment. In order to thin the shutter unit, the total thickness of the shutter blade can be 140 μm or less in an embodiment, 120 μm or less in another embodiment, and 100 μm or less in still another embodiment.

In order to obtain a shutter blade large in bending strength, the carbon fiber reinforced plastic layer that has a thickness larger than the total thickness of the plastic material and the black coatings formed on both surfaces of the plastic material is preferably used.

When a plastic material not less than 10 μm and not more than 15 μm is used as the substrate, in order to easily produce a shutter blade and to obtain the one high in strength, the individual layers preferably satisfy the following inequality (1):

$$a<2a<b<(b+2a)<2b<c<(2a+b+2c) \quad (1)$$

where the thickness of the black coating is a (μm), the thickness of the plastic material is b (μm), and the thickness of the prepreg sheet is c (μm) as to the thicknesses of the layers in their states before thermal processing.

Figure 5B:
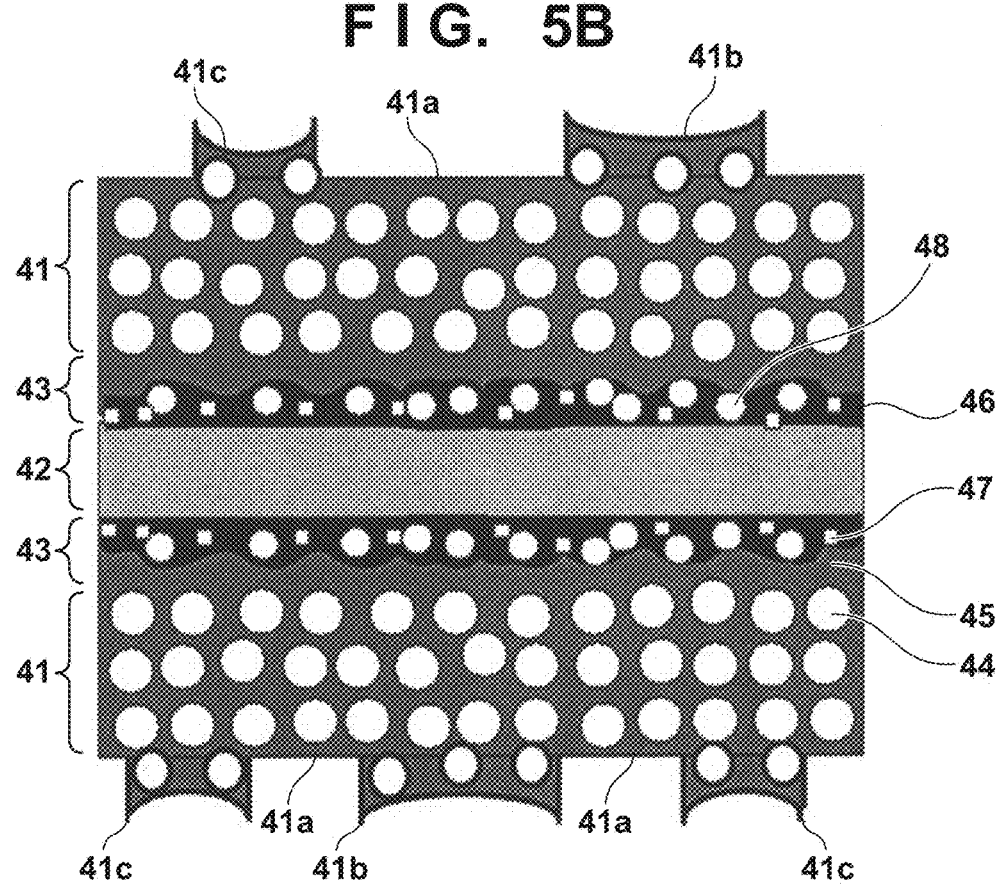
FIG. 5B is a cross-sectional view of a fiber reinforced laminate according to an embodiment.

FIG. 5B exemplarily shows a cross-sectional view of a fiber reinforced laminate according to another embodiment. On the carbon fiber reinforced plastic layers 41, projection parts 41b and projection parts 41c adjacent to recess parts 41a are further formed. A fiber reinforced laminate has been formed as a laminate through stacking of prepregs which are obtained by impregnating carbon fibers with a resin, followed through heating hardening thereof, since such fibers themselves have poor adherence with peripheral fibers. Reduction of warping of such prepregs having been requested, according to this embodiment, a fiber reinforced laminate with a less warp can be realized, and when the fiber reinforced laminate is used for a shutter blade, a shutter blade with a less warp can be provided.

Japanese Patent No. 5411841 discloses, in order to reduce such a warp, a light shielding blade material for an optical apparatus in which dome-like projection parts which reinforcement fibers do not come into are formed on its surface.

There can be provided a fiber reinforced laminate less in warp with a simple structure by using a fiber reinforced laminate which includes: a substrate; and fiber reinforced layers respectively provided on both surfaces of the substrate, and is characterized in that a plurality of projection parts are formed on the surfaces of the fiber reinforced layers along the surface direction, and in that the upper surfaces of the plurality of projection parts are concave surfaces.

Figure 1A:
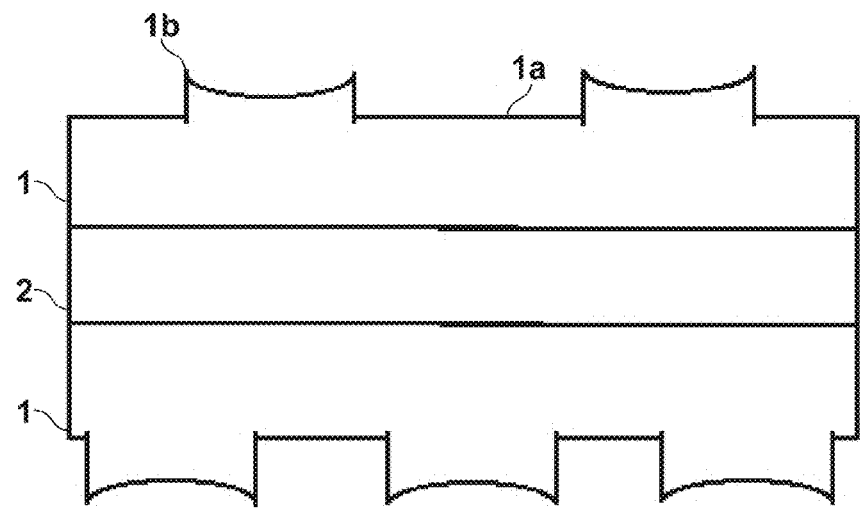
FIG. 1A is a diagram showing a cross section of fiber reinforced layers of a fiber reinforced laminate according to an embodiment of the present invention.
Figure 1B:
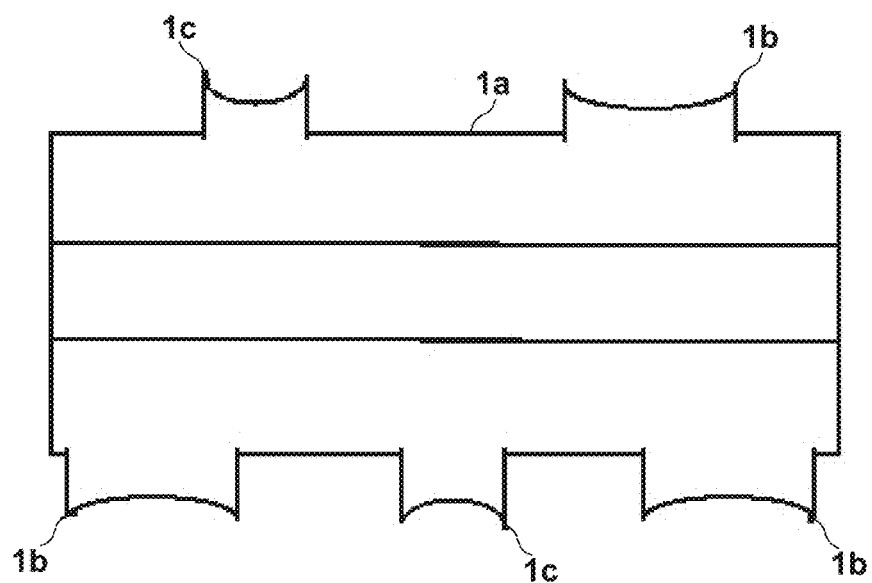
FIG. 1B is a diagram showing another cross section of the fiber reinforced layers of the fiber reinforced laminate according to an embodiment of the present invention.

FIG. 1A is a cross section of fiber reinforced layers 1 with their projection parts 1b only picked out. In FIG. 1B, a fiber reinforced laminate includes the fiber reinforced layers 1 provided on both surfaces of a substrate 2. On the surface of the fiber reinforced layer 1, a plurality of projection parts 1b and 1c are formed along the surface direction, and the upper surfaces of the plurality of projection parts 1b and 1c are concave surfaces.

In other words, on the fiber reinforced layer 1, the projection parts 1b projecting in the thickness direction of the laminate are provided with a recess part 1a being as a reference, and the projection part 1b is thickening as going from the center portion of the projection part 1b toward the recess part 1a. In FIG. 1B for another cross section different from that of FIG. 1A, on the fiber reinforced laminate, the projection parts 1b and the projection parts 1c smaller in width than the projection parts 1b are alternately provided with the recess part 1a being as a reference.

Figure 2A:
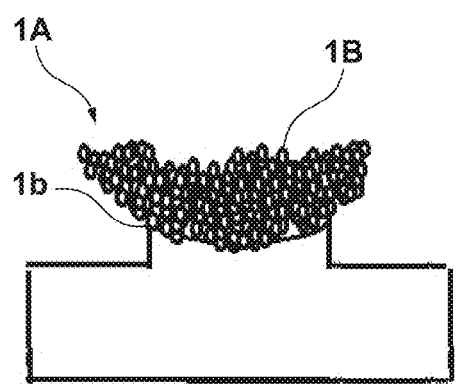
FIG. 2A is a diagram showing a state of adhesion to a release sheet.

As shown in FIG. 2A, in such a reinforcement fiber layer, the projection part 1b is formed by softening the matrix resin of the fiber reinforced layer, and after that, hardening it in the state where the fiber reinforced layer 1 is in partial contact with the tip of a fiber bundle 1B of a release sheet 1A. The projection part 1c shown in FIG. 1B is formed by contact with the tip of a fiber bundle 1C which is woven in the direction intersecting the fiber bundle 1B of the release sheet 1A. In this stage, the shapes of the surfaces of the projection parts 1b and 1c which surfaces are the opposite surfaces to the substrate 2 are concave surfaces. On the release sheet side of the fiber reinforced layer 1, the softened matrix resin is hardened in the state it is gradually soaked up by capillarity from a portion in contact with fibers of the release sheet to fibers separate from the contact end of the reinforcement fiber layer. In this stage, the recess part is not in contact with the release sheet but is maintained to be able to freely expand or shrink. Therefore, the recess part maintains the shape according to shapes of members which sandwich the release sheet (of flat surfaces of pressing plates or heated dies of a hot press). As a result, the projection parts protruding in the thickness direction with the recess part as a reference also have the shapes according to the recess part, which reduces a warp of the fiber reinforced laminate. While the aforementioned embodiment has been described using a thermosetting resin, the projections and recesses may be formed by adjusting softening and hardening using a thermoplastic resin.

Figure 2B:
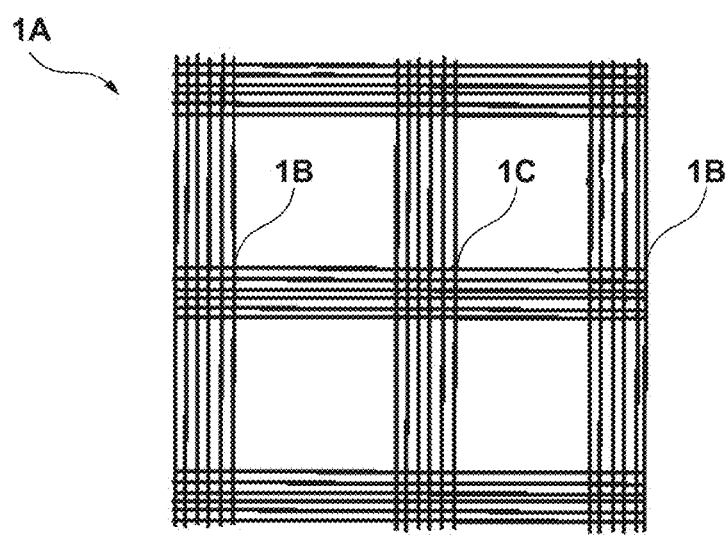
FIG. 2B is an optical microscope picture exemplarily showing the release sheet.

As this release sheet 1A, a release sheet in which particles with releasability are stuck onto woven fibers, and the woven fibers periodically have pores therebetween is preferably used. FIG. 2B exemplarily shows, as such a release sheet, an optical microscope picture of a release sheet. Accordingly, while projection part 1b and the projection part 1c radially thicken from the contact ends as their centers more toward the recess part 1a, their directions in which they tend to stepwise thicken are perpendicular to each other over the whole projection parts. In other words, stepwise changes of the concave surfaces of the projection part 1b and the projection part 1c are in directions intersecting each other. Notably, the projection part 1b or the projection part 1c is formed so as to project by thickening relative to the recess part. This can reduce occurrence of "mesh opening" that the matrix resin rises in the perpendicular direction to the plane on which the carbon fibers are laid, which widens gaps between the carbon fibers. In order to reduce such mesh opening, the area of the projection parts is preferably large relative to the area of one surface of the shutter blade, and is preferably 30% or more. Meanwhile, when it is too large, this causes lack of the matrix resin, so the area of the projection parts is preferably not more than 90% relative to the area of the one surface of the shutter blade. Still preferably, the area of the projection parts is preferably not less than 40% and not more than 80% relative to the area of the one surface of the shutter blade. Notably, the surfaces of the projection parts may be coated with a black coating or the like. Even if the projection parts are coated with the black coating, less warping has been already achieved. Hence, the shapes of the projection parts may be present on the surface, or the projection parts may result in their low profiles due to smoothing with the coating film.

Figure 3A:
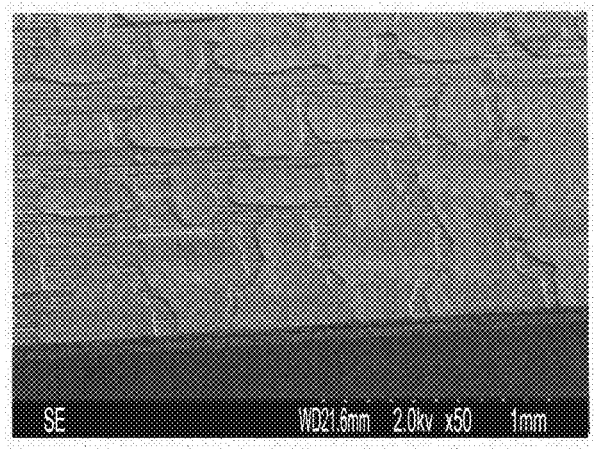
FIG. 3A is a surface picture of a fiber reinforced laminate according to an embodiment of the present invention with an electron microscope.
Figure 3B:
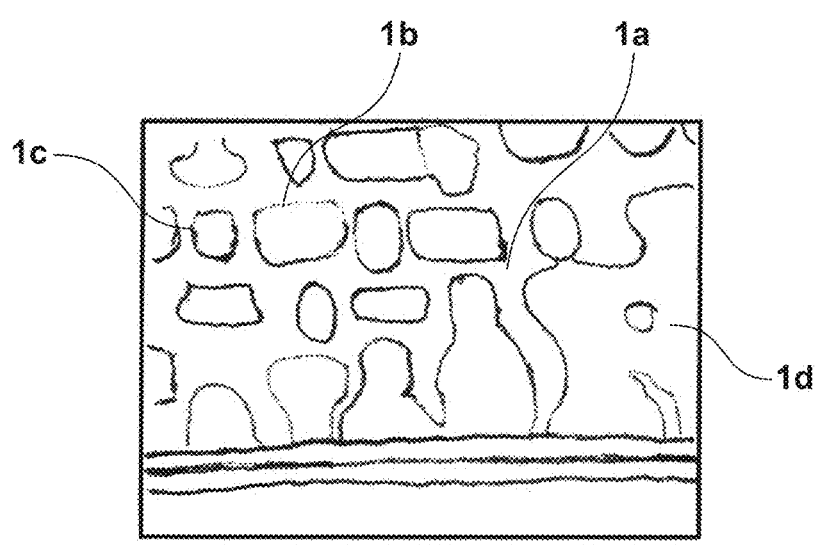
FIG. 3B is an explanatory diagram of projections and recesses on the surface of a fiber reinforced laminate according to an embodiment of the present invention.

FIG. 3A shows a surface picture of a fiber reinforced laminate according to an embodiment with an electron microscope. FIG. 3B is a schematic diagram of FIG. 3A, in which the projection parts 1b and the projection parts 1c are alternately formed on the recess part 1a as a reference. Moreover, in the case where it is used as a shutter blade, sliding resistance can be made small when the projection parts 1b and the projection parts 1c are connected along the travelling direction of the shutter blade to form rails which thicken toward the recess part 1a. Such a portion in which the projection parts 1b and the projection parts 1c are connected is shown as a projection part 1d, and the projection part 1d extends so as to meander toward a direction intersecting the fiber direction of the fiber reinforced layer 1. The ridge line of the projection part 1d may extend so as to partially meander in the transverse direction of the shutter blade, or may extend so as to totally meander in the transverse direction of the shutter blade.

Figure 4A:
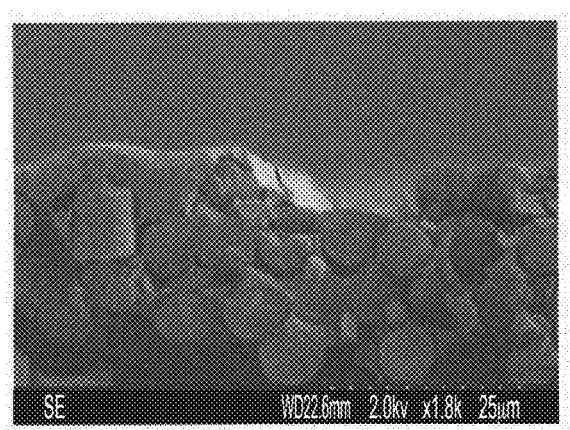
FIG. 4A is a partially expanded view of a projection part with an electron microscope.
Figure 4B:
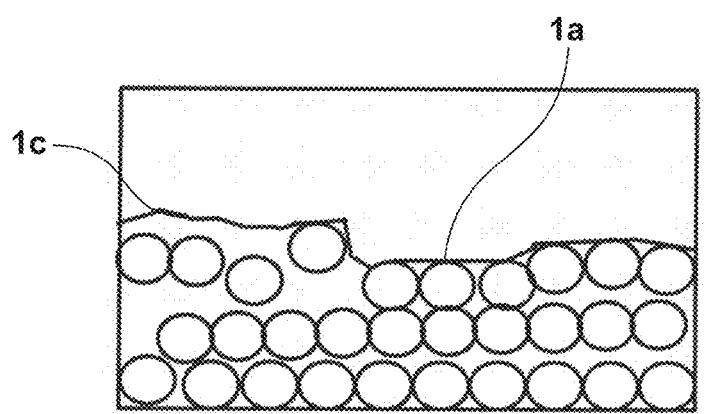
FIG. 4B is a schematic diagram of FIG. 4A.

FIG. 4A is an expanded picture of a tip part of the shutter blade, and a plurality of fibers come into the projection part. As shown in FIG. 4B, which is a schematic diagram of FIG. 4A, in a portion, of the projection part 1b, that has the same thickness as that of the recess part 1a, cross sections of cylindrical fibers exist. Since the projection part thickens toward its end part, the diameter of a fiber coming into the projection part lengthens toward the recess part adjacent to the projection part. Hence, the projection part has stronger elasticity more toward the recess part. Thus, the projection parts strengthen due to fibers coming into themselves, which can achieve the fiber reinforced laminate which is light in weight and high in bending elasticity since such materials high in bending elasticity are arranged on its thicknesswise surface layer side. As shown in FIG. 4A, the recess part exhibits the shape of the fibers on its surface due to less matrix resin as a reinforcement fiber layer, and thus, forms a convex and concave surface whose intervals coincide with the diameters of the fibers. Accordingly, in the shutter blade, the recess part forms a fine convex and concave surface whose intervals coincide with the diameters of the fibers along the transverse direction of the shutter blade, which can reduce portions thereof that share the same plane and can reduce its warping.

According to the present embodiment, there may be provided a fiber reinforced laminate including a substrate and a pair of fiber reinforced layers on both surfaces of the substrate, wherein each of the pair of fiber reinforced layer has projection parts on the opposite surface to the substrate side surface and a recess part which is adjacent to the projection parts and serves as a reference of the thicknesses of the projection parts, and the projection parts are thickening toward the recess part. Notably, when the projection part is thicker than the recess part by 1.5 fibers, it tends to be weak, and when it is thinner than the recess part by 0.5 fibers, it tends to be weak due to fibers hardly coming into it. Therefore, in view of 7 μm of single fiber diameter of PAN-based carbon fibers, the thickest portion is preferably approximately 3 to 10 μm thick. Such a fiber reinforced laminate can be preferably used as a material, for example, for a shutter blade less in warp with a simple structure. Notably, while according to an embodiment, there are used long fibers continuous in the longitudinal direction of the shutter blade for the blade itself, there may be used short fibers. By using such short fibers whose size allows them to come into the projection parts, the projection parts can be easily reinforced. While in the present embodiment, PAN-based carbon fibers are used, other carbon fibers are preferably fibers light in weight and high in rigidity, such as carbon nanotubes (CNT) and cellulose nanofibers (CNF). Moreover, the fiber reinforced layer may be formed of inorganic fibers such as glass fibers, boron fibers and metal fibers, or organic fibers such as aramid fibers.

On the opposite surface sides of the pair of fiber reinforced layers to the substrate side surfaces, other projection parts 1c (projection parts 1d) larger in surface area than the projection parts 1b may be provided. By the other projection parts 1c (projection parts 1d) thickening toward the recess part 1a, the fiber reinforced laminate can be achieved to be a sheet less in warp with a simple structure. Moreover, since the projection parts 1b and the other projection parts 1c are formed using gaps between fibers of the release sheet, they are stepwise thickening toward the adjacent recess part 1a. Further, the direction in which the other projection parts 1c are stepwise thickening is a direction intersecting the direction in which the projection parts 1b are stepwise thickening. Thereby, the area of the surfaces which share the same plane can be reduced, and a fiber reinforced laminate which hardly causes a warp can be achieved.

According to the present embodiment, the black coating may be present between the substrate and the fiber reinforced layer, or the substrate and the fiber reinforced layer may be directly or indirectly bonded to each other. The substrate or the black coating which is adjacent to the fiber reinforced layer may be bonded to the fiber reinforced layer at a flat surface or at a coarse surface. Further, even when they are bonded to each other at a substantial flat surface or at a coarse surface, projections and recesses (recess parts 1a, projection parts 1b, projection parts 1c, projection parts 1d and the like) which are provided in the fiber reinforced layer on the opposite surface to the substrate side surface are desirably projections and recesses larger than projections and recesses on the substrate side surface. Notably, in the presence of the projection parts 1b and 1c and the like regardless of the surface shape, when coating to form a black coating with a resin is further performed, adhesiveness of such a black coating can be enhanced.

(Hardening Molding Method of Fiber Reinforced Laminate)

Next, a hardening molding method for preferably forming the fiber reinforced laminate of the present embodiment is described. The hardening molding method of the present embodiment is a hardening molding method particularly for a fiber reinforced laminate in which a substrate on which black coatings are provided, as an intermediate layer, are sandwiched and stacked by two carbon fiber reinforced plastics as shown in FIGS. 5A and 5B. As the hardening molding method, for example, a hot pressing method and an autoclave method are applicable. For the present embodiment, an application of the hot pressing method is particularly described.

First, as precursors for carbon fiber reinforced plastic layers, for example, according to an embodiment, two CFRP prepreg sheets in which an epoxy resin is the matrix resin are used. Next, a black coating solution obtained by mixing the binder resin, carbon black as the black particles, and the filler at a predetermined blending ratio is coated on both surfaces of a plastic material (plastic sheet) which is the intermediate layer by the aforementioned coating method, followed by being dried, forming the black coatings.

The plastic sheet on which the black coatings are provided is overlapped with the prepared CFRP prepreg sheets in the state of being sandwiched by these, affording a laminate sheet. After that, in order to bring this laminate sheet into the fiber reinforced laminate, releasable films composed of polytetrafluoroethylene (PTFE) sheets and the like are overlapped with the surfaces of the CFRP prepreg sheets. In the embodiment in which projection parts are formed on the fiber reinforced laminate, releasable films composed of PTFE sheets and the like in which PTFE adheres to woven fibers and pores periodically exist between the woven fibers are overlapped with the surfaces of the CFRP prepreg sheets.

The laminate sheet with which the releasable films are overlapped is placed between pressing plates of a hot pressing machine to undergo heating hardening molding under the conditions of a temperature not less than 120° C. and not more than 140° C., and a pressure not less than 0.1 MPa and not more than 0.5 MPa for a time not less than 1 hour and not more than 2 hours. This heating hardening molding reduces the viscosity of unhardened matrix resin in the CFRP prepreg sheets, and the matrix resin flows into the concavities formed on the surfaces of the black coatings. After that, the matrix resin polymerizes to three-dimensionally crosslink, which proceeds the hardening reaction of the matrix resin, affording the fiber reinforced laminate composed of a laminate in which the layers are stacked and closely adhere to one another.

When using the releasable films composed of PTFE sheets and the like in which pores periodically exist between woven fibers, on the release sheet side, portions which are not in contact with the releasable film form the recess part 41a which is a reference with respect to the thicknesses of the projection parts 41b and 41c. Further, the heated and softened matrix resin is soaked up, along with carbon fibers, from the contact tips between the releasable film and the matrix resin into gaps of peripheral fibers by capillarity from portions where the matrix resin is in contact with fibers of the release sheet. As a result, on the carbon fiber reinforced plastic layers as the fiber reinforced plastic layers, the projection parts 41b and 41c which thicken toward the recess part 41a are formed. On the projection parts 41b and 41c, the concave surfaces which satisfy the aforementioned relation are formed.

After that, heating by the hot pressing machine is stopped for gradual cooling. A temperature at which the laminate sheet is taken out of the pressing plates of the hot pressing machine can be 50° C. or less according to an embodiment. The release sheets disposed on both surfaces of the taken out fiber reinforced laminate are removed, affording the fiber reinforced laminate for forming a shutter blade. Moreover, for the embodiment in which the projection parts exist on the fiber reinforced laminate, since the fiber reinforced laminate is in partial contact with the release sheets, the release sheets can be easily separated therefrom.

The fiber reinforced laminate after the hardening molding undergoes punching processing to have a desired outline shape and to be finished as a shutter blade. The fiber reinforced laminate after the hardening molding having the projection parts has a sheet shape less in warp, undergoes punching processing to have a desired outline shape and to be finished as a shutter blade less in warp. Methods of such punching include wire cutting, and press punching. According to an embodiment, with low costs taken into consideration, the method of punching is press punching.

As above, when the fiber reinforced laminate of the present embodiment is used as a shutter blade, rigidity and light shielding ability needed for the shutter blade can be realized, and adherence at interfaces of the layers of the fiber reinforced laminate which are composed of different materials can be improved. As a result, there can be provided a fiber reinforced laminate for a shutter blade which improves drive durability characteristics in the case of being used as an ultrahigh speed shutter.

EXAMPLE

Hereafter, the embodiment of the present invention will be further described with an example. The present invention is not limited to these without departing from its spirit.

First, as carbon fiber reinforced plastic layers constituting a shutter blade material, CFRP prepreg sheets in which carbon fibers were continuously even in one direction and an epoxy resin was its main component (Product Name: Pyrofil Prepreg CFRP, Mitsubishi Rayon Co. Ltd.; 32 µm of thickness; 130° C. of recommended hardening temperature) were used. The diameter (transverse directional diameter) of a single fiber of the carbon fibers used for these CFRP prepreg sheet was 7 µm.

Next, as a plastic material constituting a substrate, a biaxially oriented transparent PET sheet (12 µm of thickness) was used. Moreover, in order to form black coatings on the surfaces of the PET sheet, a light shielding film coating solution containing 72 mass % of binder resin composed of an acrylic resin, 13 mass % of carbon black (0.1 µm of average particle diameter), and 4 mass % of silica particles (3 µm of average particle diameter) which was a filler was prepared. The light shielding film coating solution was applied on both surfaces of the PET sheet by a bar coating method such that each average thickness when dried was 5 µm, and dried to form the black coatings, affording the PET sheet provided with the black coatings to be used in this example.

Next, the aforementioned PET sheet and CFRP prepreg sheets (CFRP) were overlapped with one another to form a CFRP/PET/CFRP layer structure, affording a laminate sheet. In this stage, the CFRP prepreg sheets were placed in planar symmetry such that their fiber directions were parallel to each other. Moreover, as release sheets, PTFE sheets with 50 µm of thickness were overlapped with both surfaces of the aforementioned laminate sheet.

The laminate sheet with which the release sheets were overlapped was put in a hot pressing machine, and its pressure was adjusted to be 0.3 MPa. After that, under the aforementioned conditions for press molding, the temperature was raised from room temperature to 130° C. at 1.5° C. per minute of heat-up rate, and was maintained at 130° C. for 2 hours. After that, the heating of the hot pressing machine was stopped for gradual cooling, and the laminate sheet which was the laminate was taken out thereof after the temperature of the laminate sheet was confirmed to be not more than 50° C.

After that, the release sheets placed on the surface layers of the laminate sheet were removed, and the fiber reinforced laminate for obtaining a camera shutter blade was obtained. In order to obtain a predetermined number of camera shutter blades, fiber reinforced laminates were produced by the same method. The predetermined desired number of fiber reinforced laminates underwent press punching processing so as to be predetermined-shaped shutter blades, affording the camera shutter blades.

As to the projection parts 41b in this case, it was approximately 400 μm in the longitudinal direction and approximately 150 μm in the transverse direction, and showed a tendency that it stepwise thinned from the ridge line between its one longitudinal portion and the recess part toward its center portion and it stepwise thickened from the center portion toward the other longitudinal portion. Moreover, as to the projection parts 41c, it was approximately 300 μm in the longitudinal direction and approximately 200 μm in the transverse direction, and showed a tendency that it stepwise thinned from the ridge line between its one longitudinal portion and the recess part toward its center portion and it stepwise thickened from the center portion toward the other longitudinal portion. Further, the longitudinal direction of the projection parts 41b and the longitudinal direction of the projection parts 41c were located in the respective directions substantially perpendicular to each other. On the whole blade, the projection parts 41b and the projection parts 41c were partially connected along its transverse direction, the projection parts were more in rate than the recess parts, and the projection parts occupied 60% in area of the whole blade.

Various characteristics were evaluated on the obtained shutter blades. First, the cross sections of the shutter blades made of the produced fiber reinforced laminates were observed to examine the states of convexities and concavities at the interfaces. The average difference in height of the convexities and concavities between the PET sheet and the black coatings was less than 0.3 μm. The average difference in height of the convexities and concavities between the carbon fiber reinforced plastics and the black coatings was 1.9 μm. As shown in FIGS. 3A and 3B, as to the projections and recesses on the surfaces of the carbon fiber reinforced plastics, the ridge line, of the projection parts, which was 5 to 8 μm thick relative to the recess part was formed, and the center part, of the projection part, which was 1 to 3 μm thick relative to the recess part was formed in the vicinity of the center of the projection part.

Moreover, in order to evaluate light shielding ability of the shutter blades produced in this example, the produced shutter blades were placed on a light box to observe the presence or absence of pin holes which transmitted light with a microscope. A shutter blade without pin holes was defined as a well light shielding article, and a shutter blade with one or more pin holes was defined as a defective light shielding article. As a result, the rate of well light shielding articles of the shutter blades produced in this example was 99.7%, and excellent light shielding ability thereof was confirmed.

Furthermore, the shutter blades produced in this example were prepared for front curtain shutter blades and rear curtain shutter blades, which were assembled in a shutter device (focal-plane shutter) as shown in FIG. 6. This shutter device was mounted on a camera to be provided for a drive durability test at 1/8000 seconds of shutter speed of the shutter device.

Investigation of durability of the shutter blades revealed no troubles therewith even after 0.3 million times of opening and closing, which showed that the shutter blades of the present invention had sufficient durability for camera shutter blades. Further, as to the camera after the aforementioned durability evaluation, the surface of the image sensor disposed close to the shutter device was observed. Any scratches caused by significant sliding scars were not observed on the surface of the image sensor. As a result, it was examined that the shutter blades produced in this example did not come into contact with the image sensor when driven but had sufficient bending rigidity with small bending.

As above, an example has been specifically described as a representation of the present invention. The present invention is not limited to the aforementioned modes.

The present invention is not limited to the above embodiments and various changes and modifications can be made within the spirit and scope of the present invention. Therefore, to apprise the public of the scope of the present invention, the following claims are made.

REFERENCE SIGNS LIST

1: Reinforcement fiber layer
1a, 41a: Recess part
1b, 1c, 1d, 41b, 41c: Projection part
2, 42: Substrate (intermediate layer)

The invention claimed is:

1. A fiber reinforced laminate comprising:
a substrate;
a black coating; and
a fiber reinforced plastic layer,
wherein:
the black coating is provided between the substrate and the fiber reinforced plastic layer, and contains a binder resin, black particles, and a filler; and
an interface between the black coating and the fiber reinforced plastic layer has a convex and concave structure formed by the filler, the fiber reinforced plastic layer has a matrix resin, and the matrix resin comes into the convex and concave structure.

2. The fiber reinforced laminate according to claim 1, wherein:
the black coating and the fiber reinforced plastic layer are provided on both surfaces of the substrate; and
a thickness of the black coating, a thickness of the substrate, and a thickness of the fiber reinforced plastic layer satisfy inequality:

$$a<2a<b<(b+2a)<2b<c<(2a+b+2c),$$

where the thickness of the black coating is a (μm), the thickness of the substrate is b (μm), and the thickness of the fiber reinforced plastic layer is c (μm).

3. The fiber reinforced laminate according to claim 1, wherein a traverse directional diameter of the filler is smaller than a traverse directional diameter of reinforcement fibers of the fiber reinforced plastic layer.

4. The fiber reinforced laminate according to claim 1, wherein the black particles contain carbon black, and a traverse directional diameter of the filler is larger than a particle diameter of the carbon black.

5. The fiber reinforced laminate according to claim 1, wherein:
the substrate is a biaxially oriented polyester (PET) film; and
the binder resin is an acrylic resin.

6. The fiber reinforced laminate according to claim 1, wherein:
a plurality of projection parts are formed on a surface of the fiber reinforced plastic layer along a surface direction; and
upper surfaces of the plurality of projection parts are concave surfaces.

7. A shutter device comprising:
a base plate in which an opening is formed;
a plurality of shutter blades that open and close the opening, wherein a longitudinal direction thereof is substantially perpendicular to a movement direction; and
a drive unit that drives the shutter blades,
wherein at least one of the shutter blades is the fiber reinforced laminate according to claim 1.

8. An optical apparatus comprising the shutter device according to claim 7.

9. A fiber reinforced laminate comprising:
a substrate;
a black coating; and
a fiber reinforced plastic layer,
wherein:
the black coating is provided between the substrate and the fiber reinforced plastic layer, and contains a binder resin, black particles, and a filler;
an interface between the black coating and the fiber reinforced plastic layer has a convex and concave structure;
the fiber reinforced plastic layer has a matrix resin; and
the interface is an interface at which the binder resin and the matrix resin are joined together.

10. The fiber reinforced laminate according to claim 9, wherein the black particles contain carbon black, and a traverse directional diameter of the filler is larger than a particle diameter of the carbon black.

11. The fiber reinforced laminate according to claim 9, wherein:
the substrate is a biaxially oriented polyester (PET) film; and
the binder resin is an acrylic resin.

12. The fiber reinforced laminate according to claim 9, wherein:
a plurality of projection parts are formed on a surface of the fiber reinforced plastic layer along a surface direction; and
upper surfaces of the plurality of projection parts are concave surfaces.

13. A shutter device comprising:
a base plate in which an opening is formed;
a plurality of shutter blades that open and close the opening, wherein a longitudinal direction thereof is substantially perpendicular to a movement direction; and
a drive unit that drives the shutter blades,
wherein at least one of the shutter blades is the fiber reinforced laminate according to claim 9.

14. An optical apparatus comprising the shutter device according to claim 13.

15. A fiber reinforced laminate comprising:
a substrate;
a black coating; and
a fiber reinforced plastic layer,
wherein:
the black coating is provided between the substrate and the fiber reinforced plastic layer, and contains a binder resin, black particles, and a filler;
an interface between the black coating and the fiber reinforced plastic layer has a convex and concave structure;
an interface between the black coating and the substrate has another convex and concave structure; and
convexities and concavities of an interface in the convex and concave structure on a fiber reinforced plastic layer side are larger than convexities and concavities of an interface in the another convex and concave structure on a substrate side.

16. The fiber reinforced laminate according to claim 15, wherein the black particles contain carbon black, and a traverse directional diameter of the filler is larger than a particle diameter of the carbon black.

17. The fiber reinforced laminate according to claim 15, wherein:
the substrate is a biaxially oriented polyester (PET) film; and
the binder resin is an acrylic resin.

18. The fiber reinforced laminate according to claim 15, wherein:
a plurality of projection parts are formed on a surface of the fiber reinforced plastic layer along a surface direction; and
upper surfaces of the plurality of projection parts are concave surfaces.

19. A shutter device comprising:
a base plate in which an opening is formed;
a plurality of shutter blades that open and close the opening, wherein a longitudinal direction thereof is substantially perpendicular to a movement direction; and a drive unit that drives the shutter blades,
wherein at least one of the shutter blades is the fiber reinforced laminate according to claim 15.

20. An optical apparatus comprising the shutter device according to claim 19.

* * * * *